United States Patent
Laberge et al.

(10) Patent No.: US 8,638,371 B2
(45) Date of Patent: Jan. 28, 2014

(54) METHOD OF MANIPULATING ASSETS SHOWN ON A TOUCH-SENSITIVE DISPLAY

(75) Inventors: Jason Laberge, New Brighton, MN (US); Pallavi Dharwada, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 517 days.

(21) Appl. No.: 12/704,987

(22) Filed: Feb. 12, 2010

(65) Prior Publication Data

US 2011/0199495 A1 Aug. 18, 2011

(51) Int. Cl.
*H04N 5/232* (2006.01)
*H04N 5/222* (2006.01)

(52) U.S. Cl.
USPC ............. 348/211.8; 348/211.13; 348/333.02

(58) Field of Classification Search
USPC .................. 348/211.8, 333.02, 211.13
See application file for complete search history.

(56) References Cited

U.S. PATENT DOCUMENTS

| | | | |
|---|---|---|---|
| 4,992,866 A | 2/1991 | Morgan | |
| 5,483,261 A | 1/1996 | Yasutake | |
| 5,872,594 A | 2/1999 | Thompson | |
| 6,208,329 B1 | 3/2001 | Ballare | |
| 6,542,191 B1 * | 4/2003 | Yonezawa | 348/333.01 |
| 6,680,746 B2 * | 1/2004 | Kawai et al. | 348/211.9 |
| 6,697,105 B1 * | 2/2004 | Kato et al. | 348/211.6 |
| 6,888,565 B1 * | 5/2005 | Tanaka et al. | 348/207.11 |
| 6,954,224 B1 | 10/2005 | Okada et al. | |
| 6,965,376 B2 * | 11/2005 | Tani et al. | 345/173 |
| 6,965,394 B2 * | 11/2005 | Gutta et al. | 348/14.05 |
| 6,973,200 B1 * | 12/2005 | Tanaka et al. | 382/103 |
| 7,030,861 B1 | 4/2006 | Westerman et al. | |
| 7,061,525 B1 * | 6/2006 | Tanaka et al. | 348/211.8 |
| 7,183,944 B2 | 2/2007 | Gutta et al. | |
| 7,278,115 B1 | 10/2007 | Conway et al. | |
| 7,362,221 B2 | 4/2008 | Katz | |
| 7,394,367 B1 | 7/2008 | Aupperle et al. | |
| 7,411,575 B2 | 8/2008 | Hill et al. | |
| 7,479,949 B2 | 1/2009 | Jobs et al. | |
| 7,519,223 B2 * | 4/2009 | Dehlin et al. | 382/203 |
| 7,535,463 B2 * | 5/2009 | Wilson | 345/175 |
| 2001/0026263 A1 | 10/2001 | Kanamori et al. | |
| 2002/0067412 A1 * | 6/2002 | Kawai et al. | 348/211 |
| 2005/0036036 A1 | 2/2005 | Stevenson et al. | |

(Continued)

FOREIGN PATENT DOCUMENTS

WO WO-9849663 A1 11/1998

OTHER PUBLICATIONS

U.S. Appl. No. 12/704,950, Advisory Action mailed May 8, 2012, 5 pgs.

(Continued)

*Primary Examiner* — Ngoc-Yen Vu
(74) *Attorney, Agent, or Firm* — Schwegman, Lundberg & Woessner, P.A.

(57) ABSTRACT

A method of manipulating assets on a touch-sensitive display. The method includes showing a camera and a field of view of the camera on the touch-sensitive display. The method further includes detecting contact with the camera or the field of view of the camera on the touch-sensitive display, and manipulating the camera based on a gesture conducted on the camera or the field of view of the camera shown on the touch-sensitive display.

12 Claims, 21 Drawing Sheets

(56) References Cited

U.S. PATENT DOCUMENTS

| | | | |
|---|---|---|---|
| 2005/0079896 A1 | 4/2005 | Kokko et al. | |
| 2005/0225634 A1 | 10/2005 | Brunetti et al. | |
| 2006/0026521 A1 | 2/2006 | Hotelling et al. | |
| 2006/0034043 A1* | 2/2006 | Hisano et al. | 361/681 |
| 2006/0036944 A1 | 2/2006 | Wilson | |
| 2006/0187196 A1 | 8/2006 | Underkoffler et al. | |
| 2007/0146337 A1 | 6/2007 | Ording et al. | |
| 2007/0171273 A1 | 7/2007 | Saleh et al. | |
| 2007/0229471 A1 | 10/2007 | Kim et al. | |
| 2008/0013826 A1 | 1/2008 | Hillis et al. | |
| 2008/0129686 A1 | 6/2008 | Han | |
| 2008/0143559 A1 | 6/2008 | Dietz et al. | |
| 2008/0168403 A1 | 7/2008 | Westerman et al. | |
| 2008/0231610 A1 | 9/2008 | Hotelling et al. | |
| 2009/0040188 A1 | 2/2009 | Shu | |
| 2009/0084612 A1 | 4/2009 | Mattice et al. | |
| 2009/0160785 A1 | 6/2009 | Chen et al. | |
| 2009/0262091 A1* | 10/2009 | Ikeda et al. | 345/173 |
| 2010/0053219 A1* | 3/2010 | Kornmann | 345/653 |
| 2010/0138763 A1 | 6/2010 | Kim | |
| 2010/0188423 A1* | 7/2010 | Ikeda et al. | 345/659 |
| 2010/0192109 A1 | 7/2010 | Westerman et al. | |
| 2010/0211920 A1 | 8/2010 | Westerman et al. | |
| 2010/0304731 A1* | 12/2010 | Bratton et al. | 455/420 |
| 2011/0093822 A1 | 4/2011 | Sherwani | |
| 2011/0117526 A1 | 5/2011 | Wigdor et al. | |
| 2011/0181526 A1 | 7/2011 | Shaffer et al. | |
| 2011/0199314 A1 | 8/2011 | Laberge et al. | |
| 2011/0199386 A1 | 8/2011 | Dharwada et al. | |
| 2011/0199516 A1 | 8/2011 | Laberge et al. | |
| 2011/0225553 A1* | 9/2011 | Abramson et al. | 715/863 |
| 2011/0239155 A1 | 9/2011 | Christie | |
| 2012/0023509 A1 | 1/2012 | Blumenberg | |
| 2012/0088526 A1 | 4/2012 | Lindner | |
| 2012/0242850 A1 | 9/2012 | Laberge et al. | |

OTHER PUBLICATIONS

U.S. Appl. No. 12/704,950, Final Office Action mailed Mar. 8, 2012, 8 pgs.

U.S. Appl. No. 12/704,950, Non Final Office Action mailed Jun. 15, 2012, 9 pgs.

U.S. Appl. No. 12/704,950, Non Final Office Action mailed Dec. 16, 2011, 6 pgs.

U.S. Appl. No. 12/704,950, Response filed Jan. 5, 2012 to Non Final Office Action mailed Dec. 16, 2011, 8 pgs.

U.S. Appl. No. 12/704,950, Response filed Apr. 25, 2012 to Final Office Action mailed Mar. 8, 2012, 8 pgs.

U.S. Appl. No. 12/704,950, Response filed Jun. 7, 2012 to Final Office Action mailed Mar. 8, 2012, 10 pgs.

"Atmel's New Family of Touch Screen Solutions Enable Two Touch Gestures for Intuitive User Interfaces", http://news.thomasnet.com/companystory/821709, (Oct. 22, 2008).

"Getac Announces Technology Breakthrough With Resistive-Type Multi-Touch Technology for "Hands-On" Applications With or Without Gloves", http://www.getac.com/news/edm/multi-touch.html, Getac Press Release, (Oct. 6, 2009).

"HTC TouchFLO review", http://msmobiles.com/news.php/6616.html, (Aug. 16, 2007).

"Touch Screen and User Interface", http://www.sony.jp/products/overseas/contents/pickup/contents/touch_screen/index.html, Undated, (Downloaded Oct. 29, 2009).

"TOUCH1600 Touch Screen DVR", http://helpdesk.portasystems.com/download/security/dvr.pdf, Porta Systems Corp., (Sep. 2008).

Davies, Chris, "Getac V100 Tablet PC gets glove-friendly multitouch display", http://www.slashgear.com/getac-v100-tablet-pc-gets-glove-friendly-multitouch-display-0759517/, (Oct. 7, 2009).

Niper, E. D, "INEL central alarm monitoring and assessment system", *Nuclear materials management*, 12, (1983), 150-155.

Posey, Brien, "Touch screen gestures", http://itknowledgeexchange.techtarget.com/brien-posey/touch-screen-gestures/, Brien Posey's Windows Blog, (Mar. 31, 2009).

U.S. Appl. No. 12/705,026, filed Feb. 10, 2010, Overlay Feature to Provide User Assistance in a Multi-Touch Interactive Display Environment.

U.S. Appl. No. 12/704,950, filed Feb. 12, 2010, Method of Showing Video on a Touch-Sensitive Display.

U.S. Appl. No. 12/704,886, filed Feb. 12, 2010, Gestures on a Touch-Sensitive Display.

U.S. Appl. No. 13/052,879, filed Mar. 21, 2011, Method of Defining Camera Scan Movements Using Gestures.

U.S. Appl. No. 12/704,886, Examiner Interview Summary mailed May 20, 2013, 3 pgs.

U.S. Appl. No. 12/704,886, Non Final Office Action mailed Apr. 12, 2013, 4 pgs.

U.S. Appl. No. 12/704,886, Notice of Allowance mailed May 23, 2013, 6 pgs.

U.S. Appl. No. 12/704,886, Response filed Mar. 25, 2013 to Restriction Requirement mailed Mar. 18, 2013, 4 pgs.

U.S. Appl. No. 12/704,886, Response filed May 14, 2013 to Non Final Office Action mailed Apr. 12, 2013, 6 pgs.

U.S. Appl. No. 12/705,026, Response filed Mar. 25, 2013 to Final Office Action mailed Feb. 12, 2013, 5 pgs.

U.S. Appl. No. 12/705,026, Examiner Interview Summary mailed Mar. 28, 2013, 3 pgs.

U.S. Appl. No. 12/705,026, Examiner Interview Summary mailed May 22, 2013, 3 pgs.

U.S. Appl. No. 12/705,026, Non Final Office Action mailed Apr. 11, 2013, 7 pgs.

U.S. Appl. No. 12/704,886, Restriction Requirement mailed Mar. 18, 2013, 5 pgs.

U.S. Appl. No. 12/705,026, Final Office Action mailed Feb. 13, 2013, 11 pgs.

U.S. Appl. No. 12/705,026, Non Final Office Action mailed Nov. 23, 2012, 10 pgs.

U.S. Appl. No. 12/705,026, Response filed Jan. 2, 2013 to Non Final Office Action mailed Nov. 23, 2012, 9 pgs.

U.S. Appl. No. 12/704,950, Final Office Action mailed Oct. 4, 2012, 10 pgs.

U.S. Appl. No. 12/704,950, Response filed Sep. 14, 2012 Non Final Office Action mailed Jun. 15, 2012, 10 pgs.

\* cited by examiner

METHOD OF MANIPULATING ASSETS SHOWN ON A TOUCH-SENSITIVE DISPLAY

BACKGROUND

Monitoring large and complex environments is a challenging task for security operators because situations evolve quickly, information is distributed across multiple screens and systems, uncertainty is rampant, decisions can have high risk and far reaching consequences, and responses must be quick and coordinated when problems occur. The increased market present of single-touch and multi-touch interaction devices such as the iPhone, GPS navigators, HP TouchSmart laptop, Microsoft Surface and Blackberry mobile devices offer a significant opportunity to investigate new gesture-based interaction techniques that can improve operator performance during complex monitoring and response tasks.

However, the solutions that are typically incorporated to address the myriad of needs in complex security environments often consist of adding a multitude of features and functions. Adding such features requires operators to remember the features available, including when and how to access them. Therefore, it would be desirable if the added features were intuitive thereby making them easy to use.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
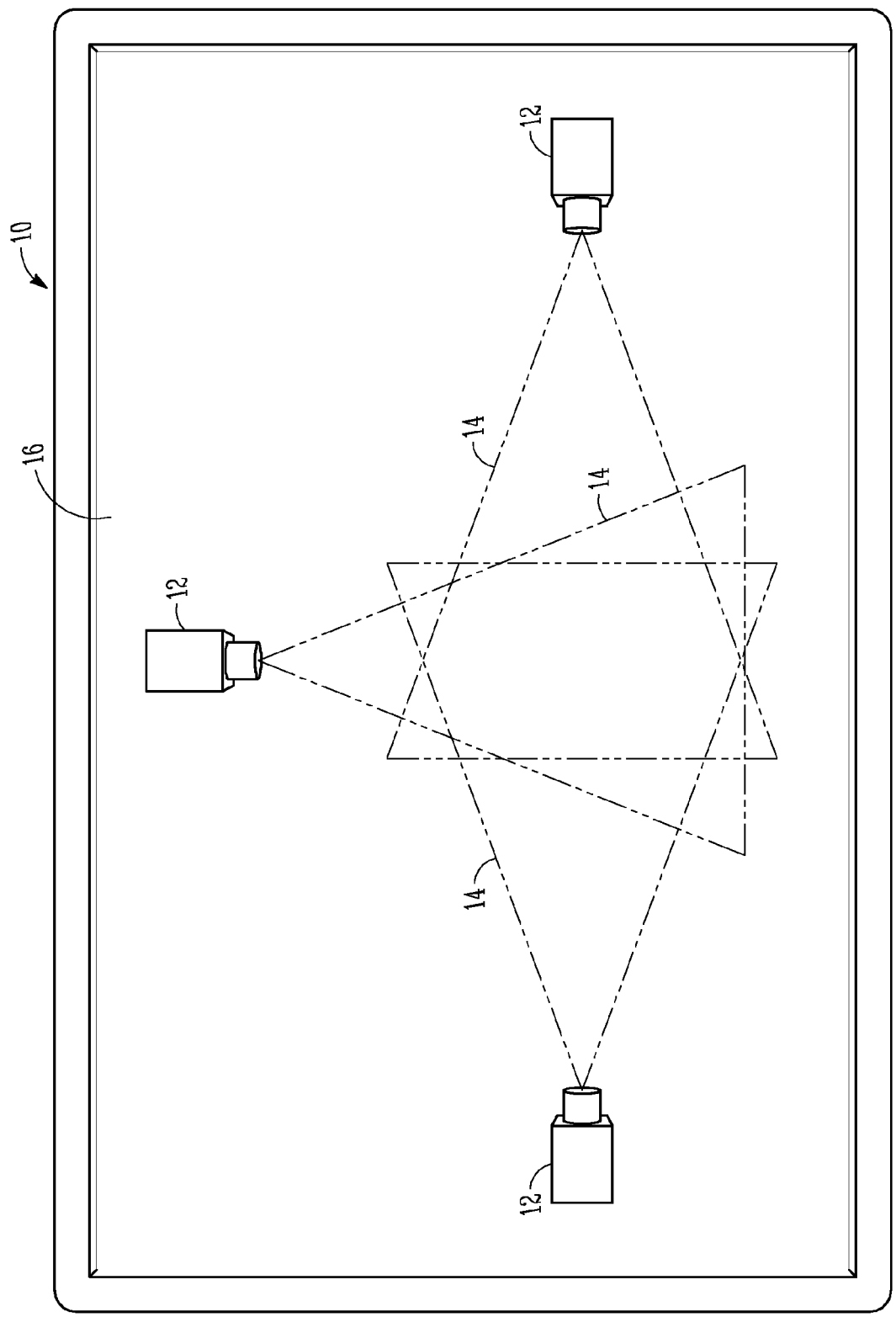
FIG. 1 illustrates a touch-sensitive display that shows an environment which includes one or more cameras and a field of view associated with each camera shown on the display.

FIGS. 1-11 illustrate an example method of manipulating assets shown on a touch-sensitive display 10. As shown in FIG. 1, the method includes showing one or more cameras 12 and/or a field of view 14 associated with each camera 12 on a touch-sensitive display 10. In some embodiments, the field of view 14 may appear on a particular camera 12 when a particular camera 12 is selected by a user 20.

Figure 2A:
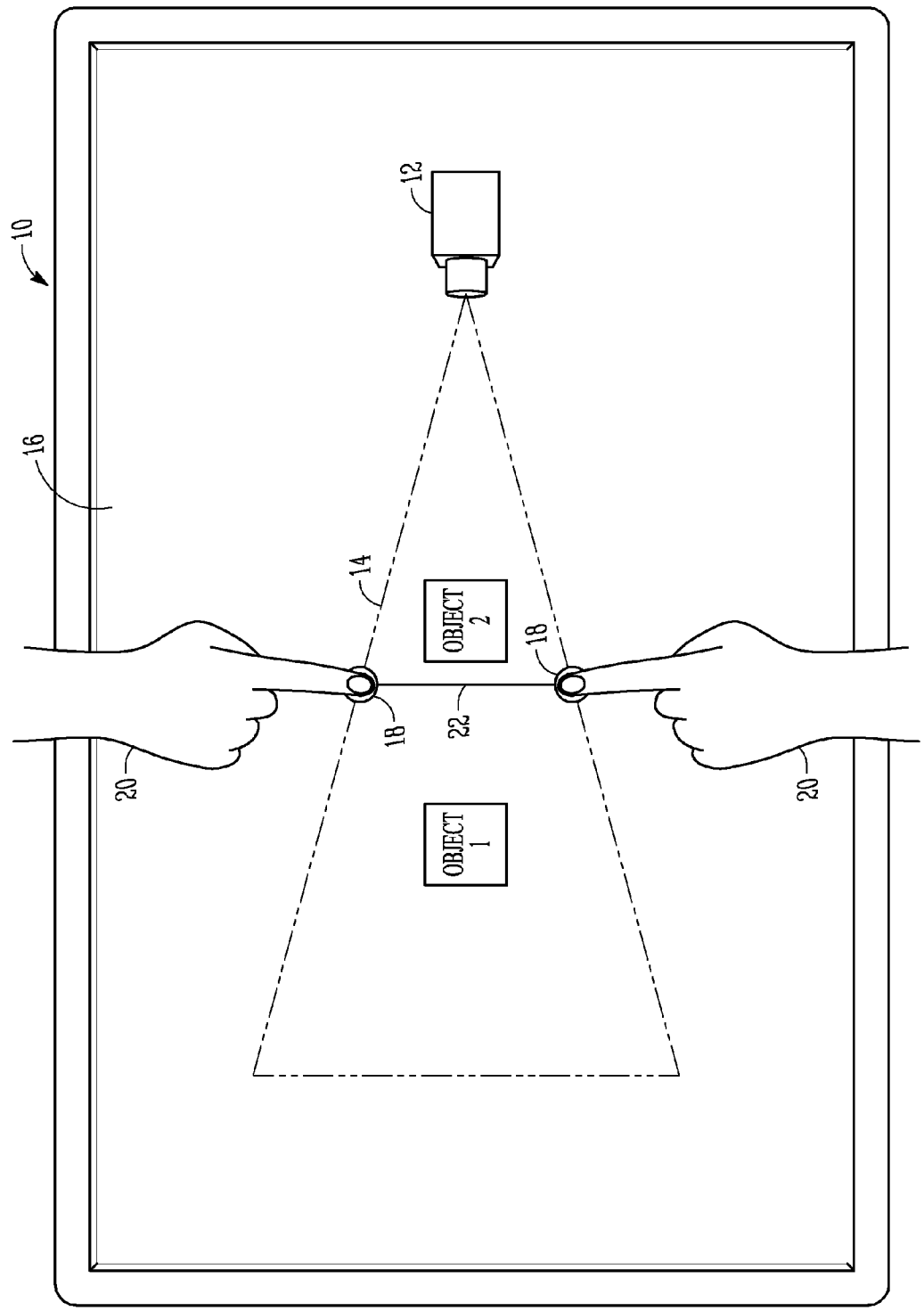
FIGS. 2A-2B illustrate an example method of manipulating the zoom of a camera based on contact with the field of view of the camera shown on a touch-sensitive display.
Figure 2B:
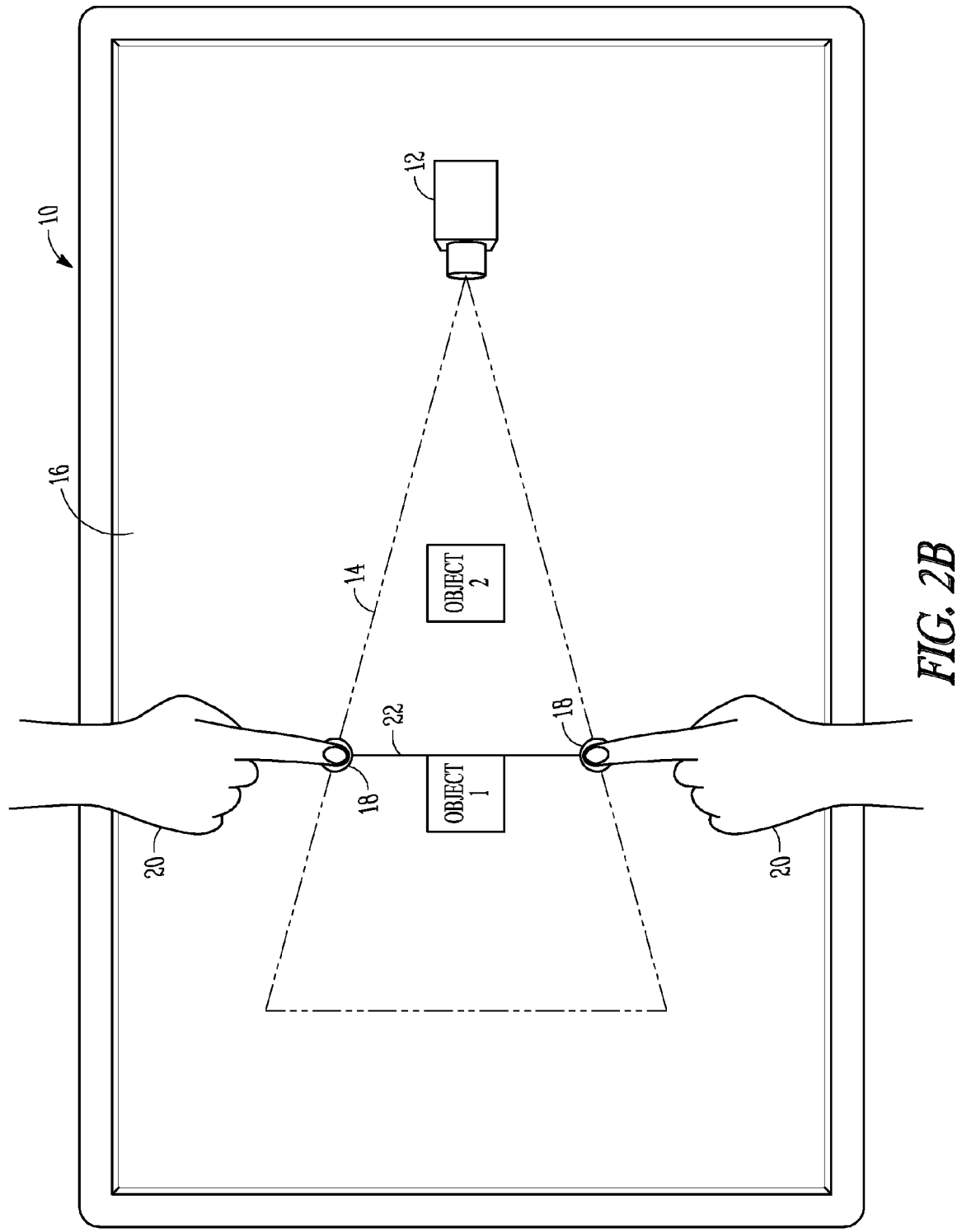

One example embodiment is illustrated in FIGS. 2A-2B. FIG. 2A illustrates that the method further includes detecting contact with the camera 12 or the field of view 14 of the camera 12 on the touch-sensitive display 10 (shown as contacting two touch point anchors 18 within the field of view 14 of camera 12). FIG. 2B illustrates that the method further includes manipulating the camera 12 based on a gesture conducted on the field of view 14 of the camera 12 shown on the touch-sensitive display 10.

In the example embodiment illustrated in FIGS. 2A-2B, a two dimensional map 16 is shown on the touch-sensitive display 10. In some embodiments, showing a field of view 14 associated with a camera 12 on the touch-sensitive display 10 may include showing a line 22 on the field of view 14 that represents the current zoom level of camera 12.

FIGS. 2A-2B illustrate that manipulating the camera 12 may include manipulating zoom functioning of the camera. FIG. 2A illustrates two touch point anchors 18 on the edges of the field of view 14. The touch point anchors 18 may appear before or after contact with the field of view 14 or camera 12 is detected. As shown in FIG. 2B, a user 20 manipulates the zoom of the camera 12 by placing two fingers on the respective touch point anchors 18 and moving the fingers toward (or away) from the camera 12. Note that in the example embodiment illustrated in FIGS. 2A-2B, the field of view 14 of the camera 12 does not change.

Figure 3A:
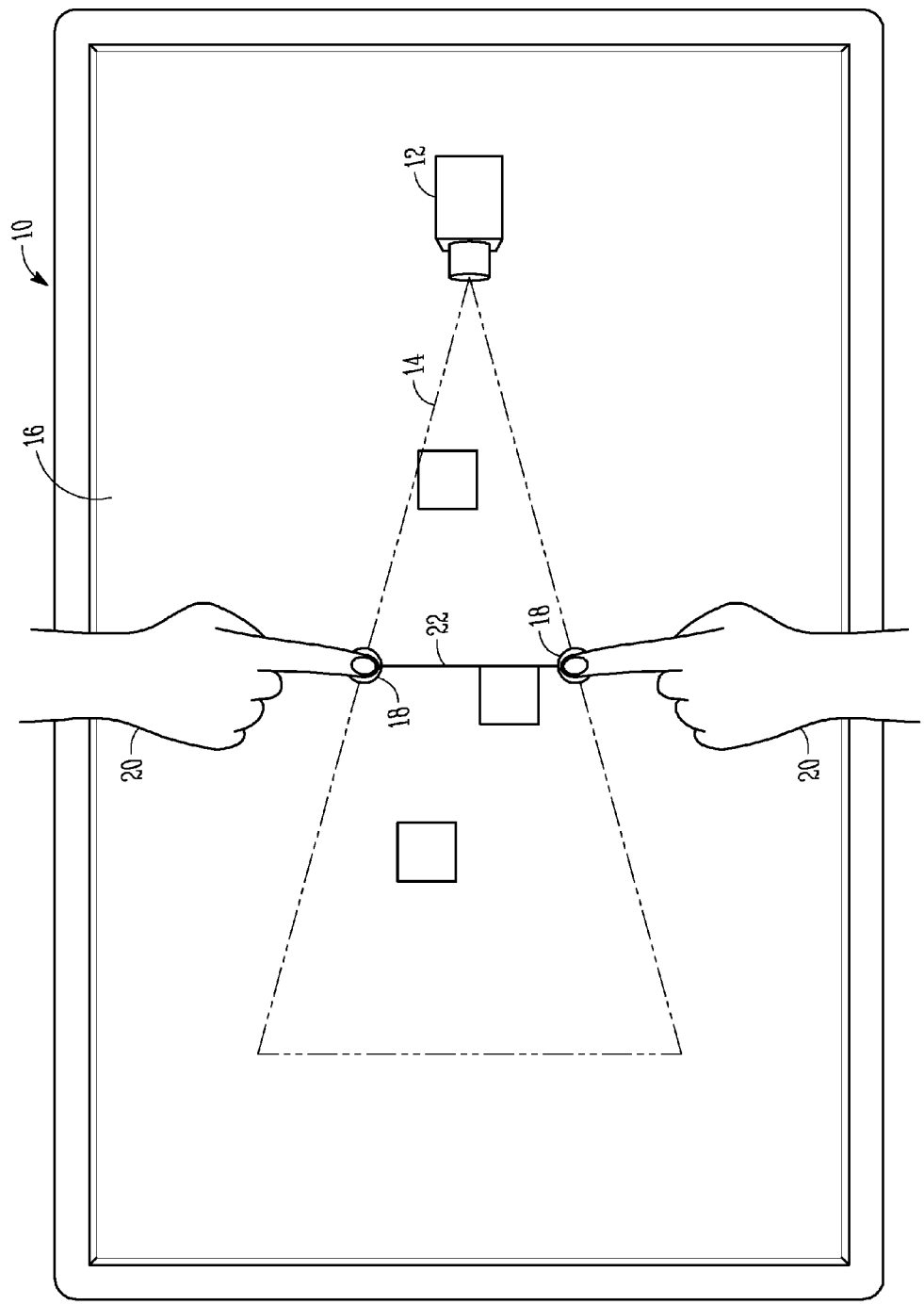
FIGS. 3A-3C illustrate another example method of manipulating the zoom of a camera based on contact with the field of view of the camera shown on a touch-sensitive display.
Figure 3B:
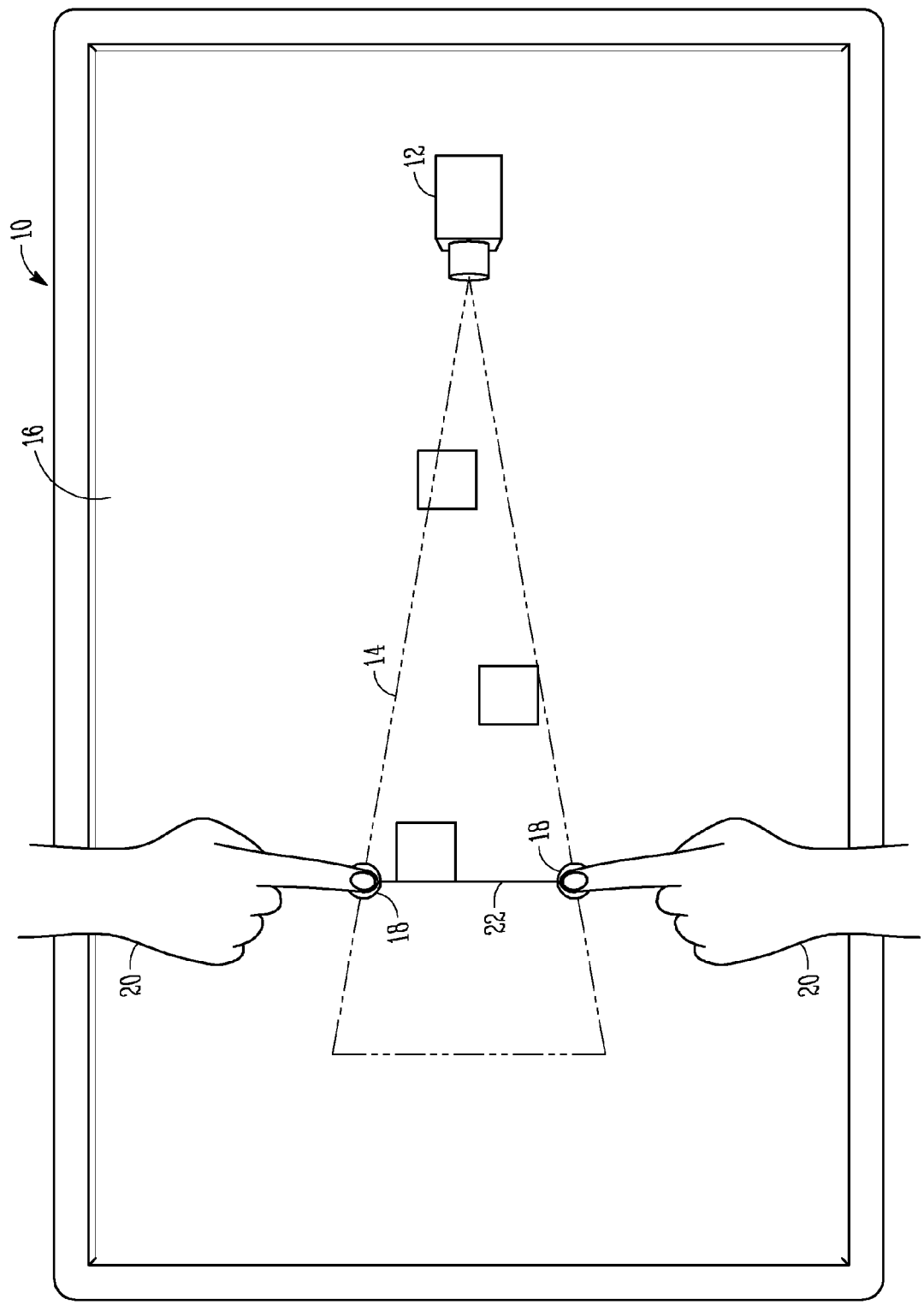
Figure 3C:
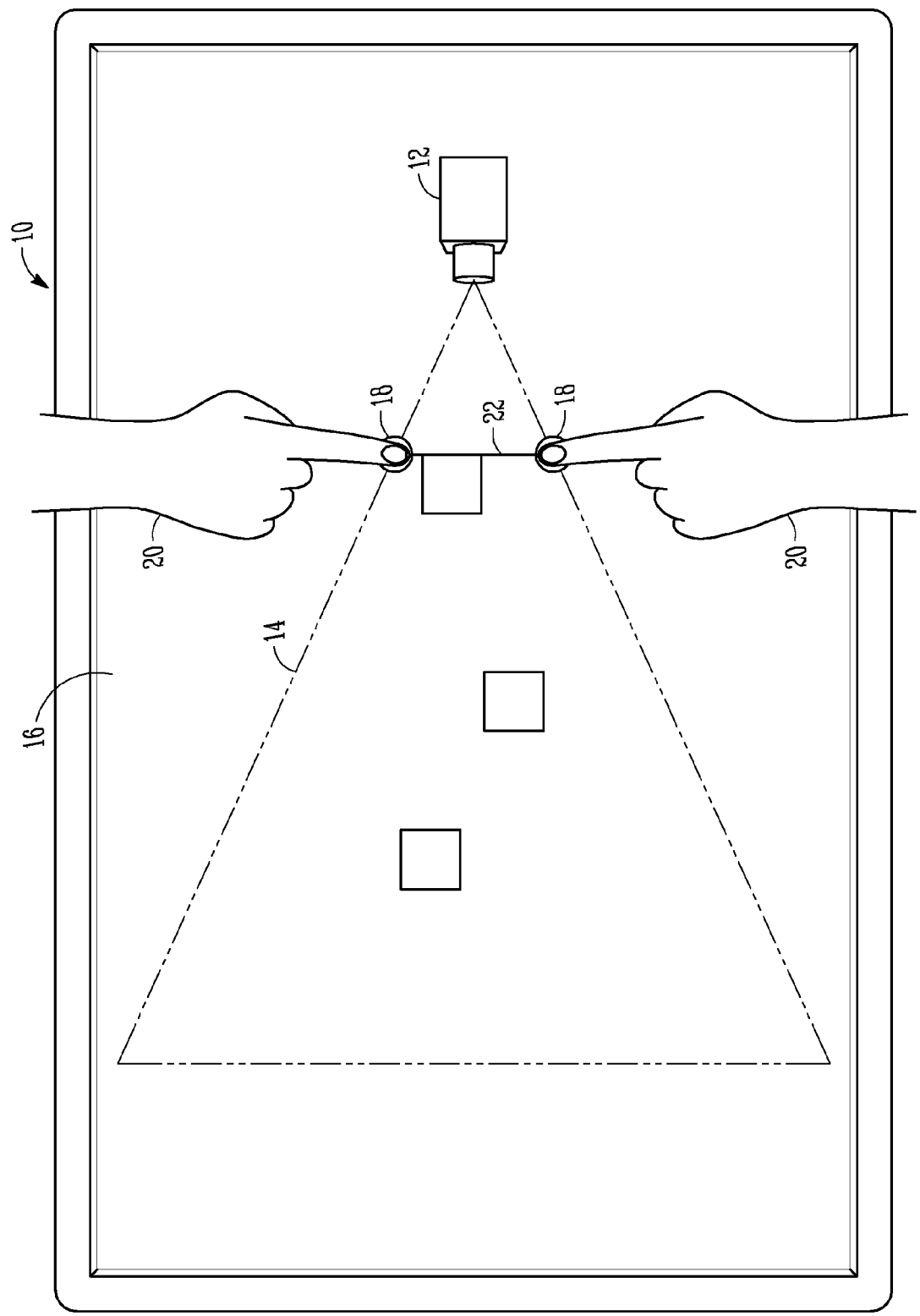

Another example embodiment relating to manipulating the zoom of a camera 12 is illustrated in FIGS. 3A-3C. FIG. 3A illustrates where contact with the field of view 14 of the camera is detected at two touch point anchors 18 shown on the display 10 somewhere along the edges of the field of view 14.

FIG. 3B illustrates manipulating the zoom of the camera 12 away from the camera by placing two fingers on the respective touch point anchors 18 and moving the fingers away from the camera 12. The field of view 14 becomes narrower as the line 22 moves away from the camera 12.

FIG. 3C illustrates manipulating the zoom of the camera 12 closer to the camera 12 by placing two fingers on the respective touch point anchors 18 and moving the fingers toward the camera 12. The field of view 14 becomes wider as the line 22 moves away from the camera 12.

Figure 4A:
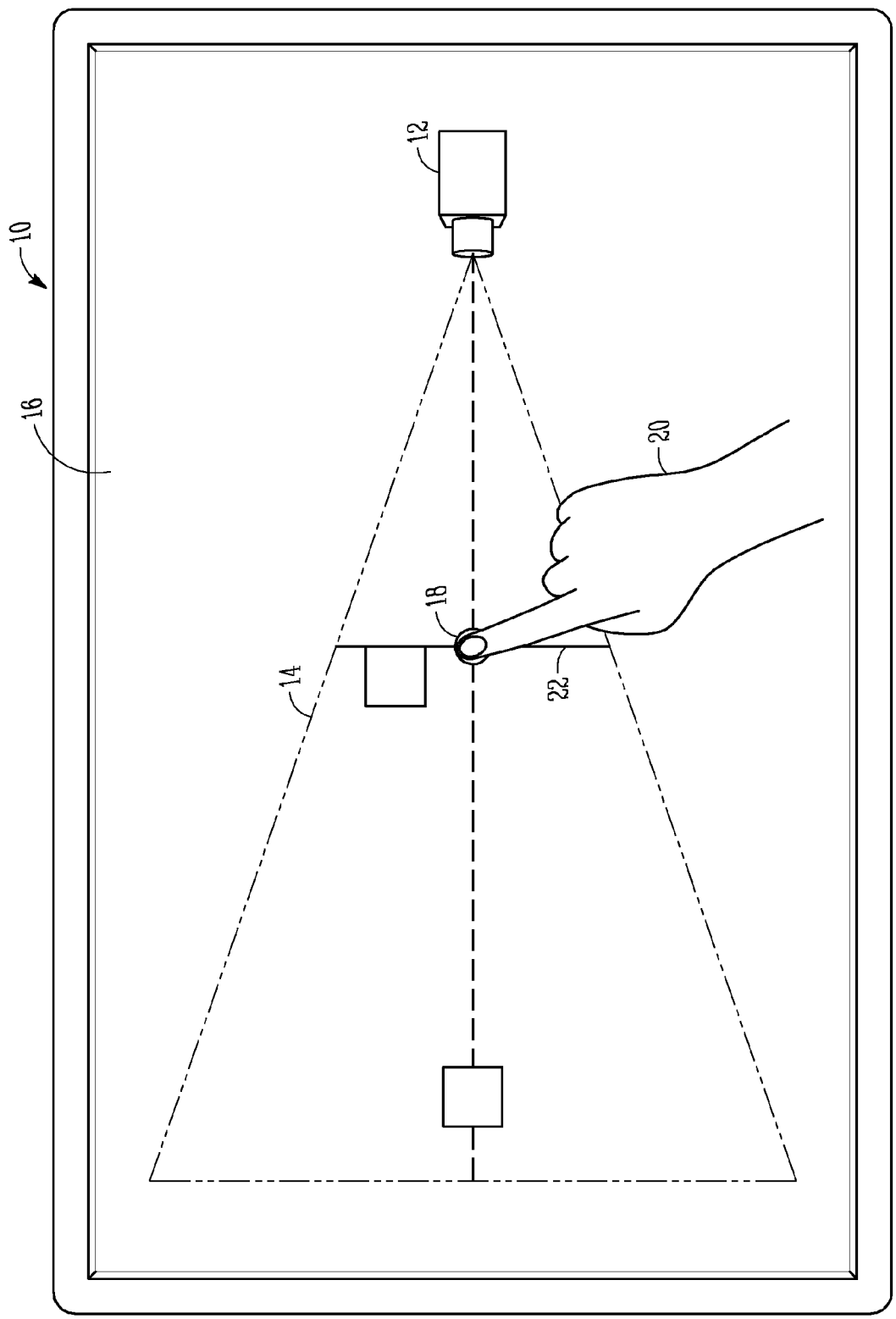
FIGS. 4A-4B illustrate an example method of manipulating the zoom of a camera based on a single contact with the field of view of the camera shown on a touch-sensitive display.
Figure 4B:
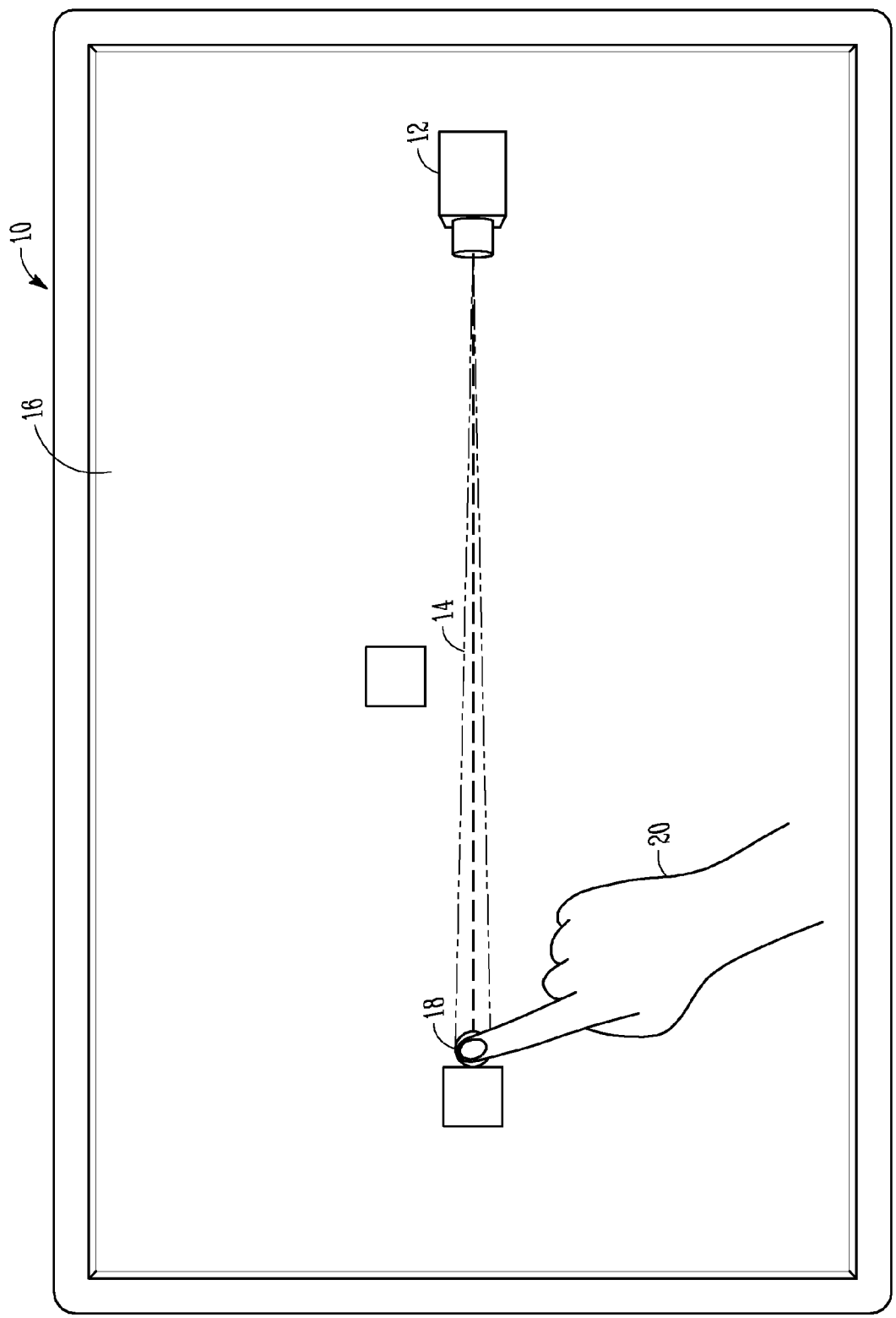

FIGS. 4A-4B illustrate another example embodiment relating to manipulating the zoom of a camera 12. FIG. 4A similarly illustrates showing on the field of view 14 a line 22 that represents the current zoom level of camera 12.

FIG. 4B illustrates manipulating the zoom of the camera 12 away from the camera by placing one finger on a touch point anchor 18 that is located anywhere on the current zoom line 22 and moving the finger away from the camera 12. The field of view 14 becomes narrower as the zoom line 22 moves away from the camera 12. The field of view 14 would obviously become wider if the zoom line 22 is moved toward the camera 12. It should be noted that in some embodiments, only a touch point anchor 18 will appear to represent the current zoom level of the camera 12. It should be noted that in other embodiments, the zoom of camera 12 may be manipulated by a single touch point anchor 18 within the camera 12.

Figure 5A:
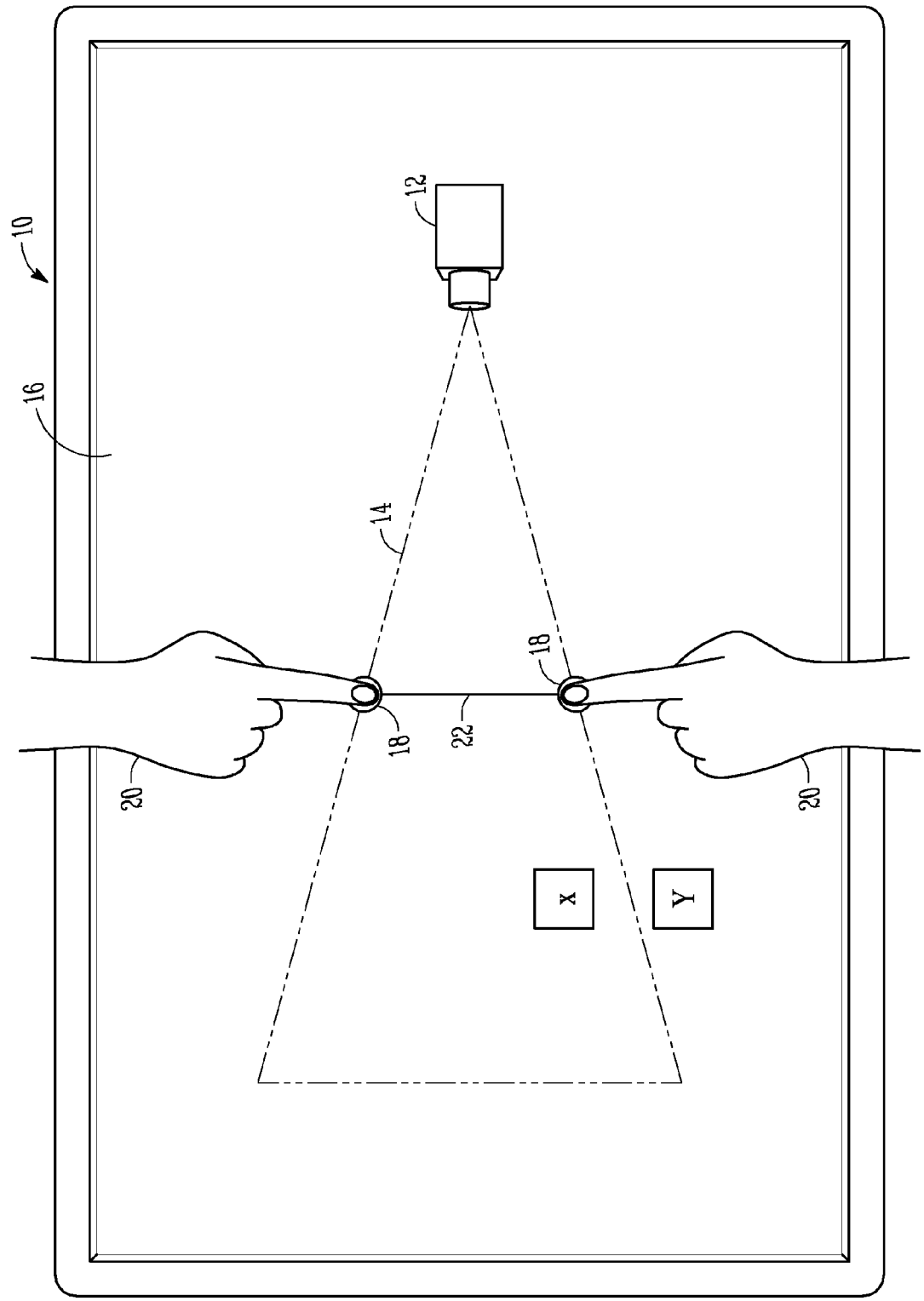
FIGS. 5A-5B illustrate an example method of manipulating the pan angle of a camera based on contact with the field of view of the camera shown on a touch-sensitive display.
Figure 5B:
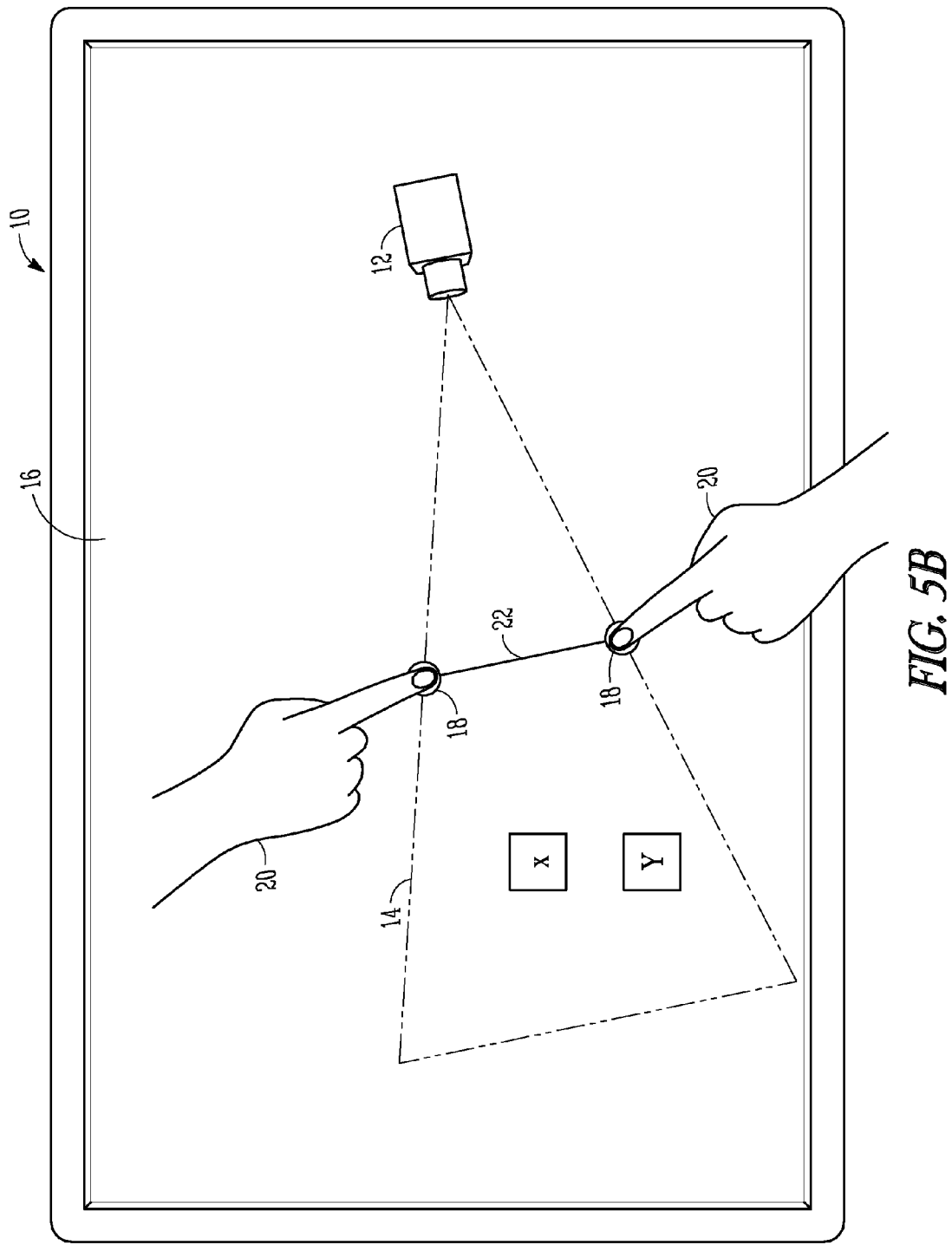

FIGS. 5A-5B illustrate that in some embodiments manipulating the camera 12 may include manipulating the pan angle of the camera 12. FIG. 5A illustrates an example embodiment where two touch point anchors 18 are shown along the edges of the field of view 14 before or after contact with the camera 12 or the field of view 14 of the camera 12 is detected. As shown in FIG. 5B, a user 20 can rotate the camera 12 by placing two fingers on the respective touch point anchors 18 and moving the fingers around the camera 12. It should be noted that in other embodiments, the camera 12 may be rotated by manipulating a single touch point anchor 18 within the camera 12 or the field of view 14 of the camera 12.

Figure 6A:
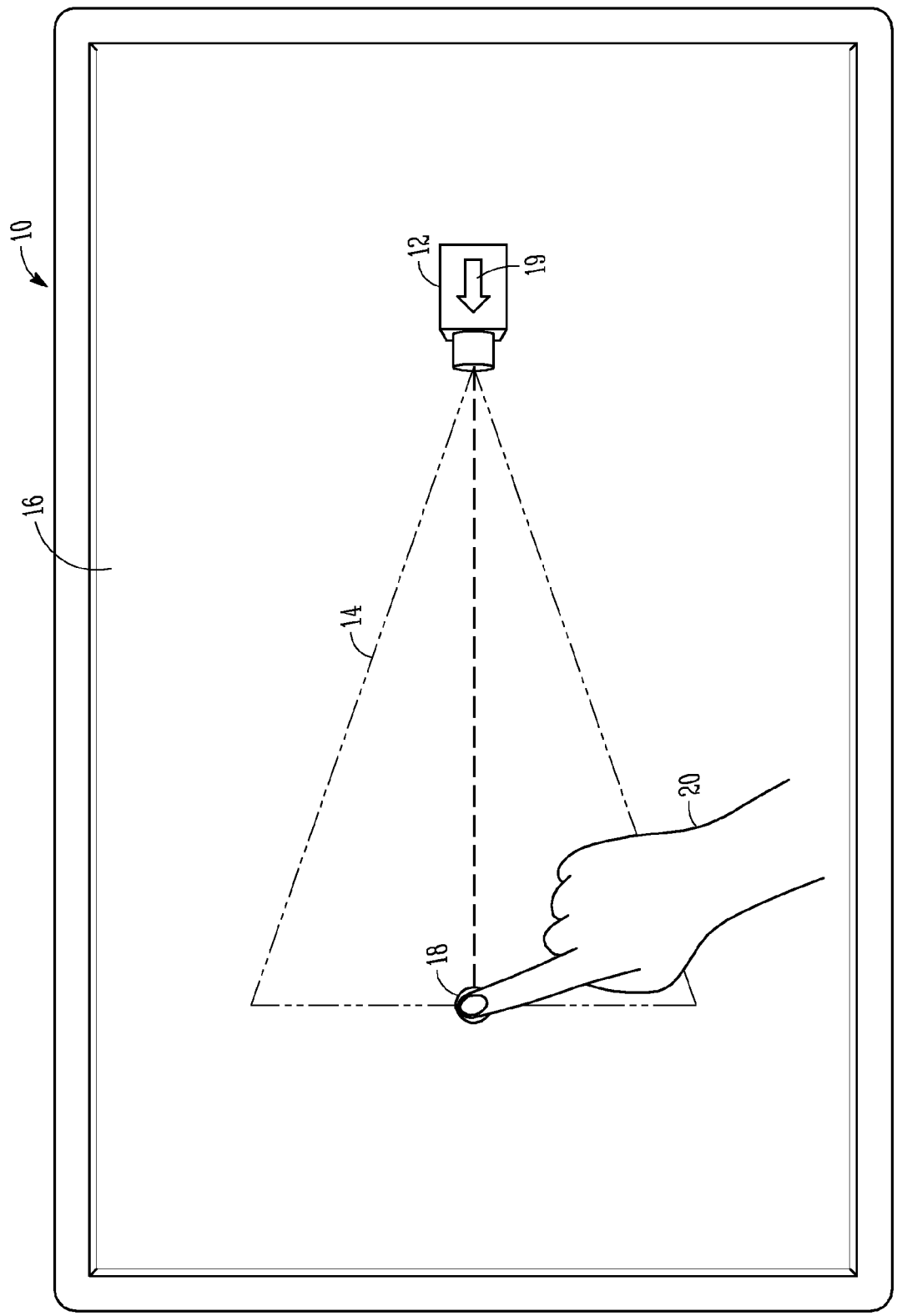
FIGS. 6A-6B illustrate an example method of adjusting the tilt angle of a camera based on contact with the field of view of the camera shown on a touch-sensitive display.
Figure 6B:
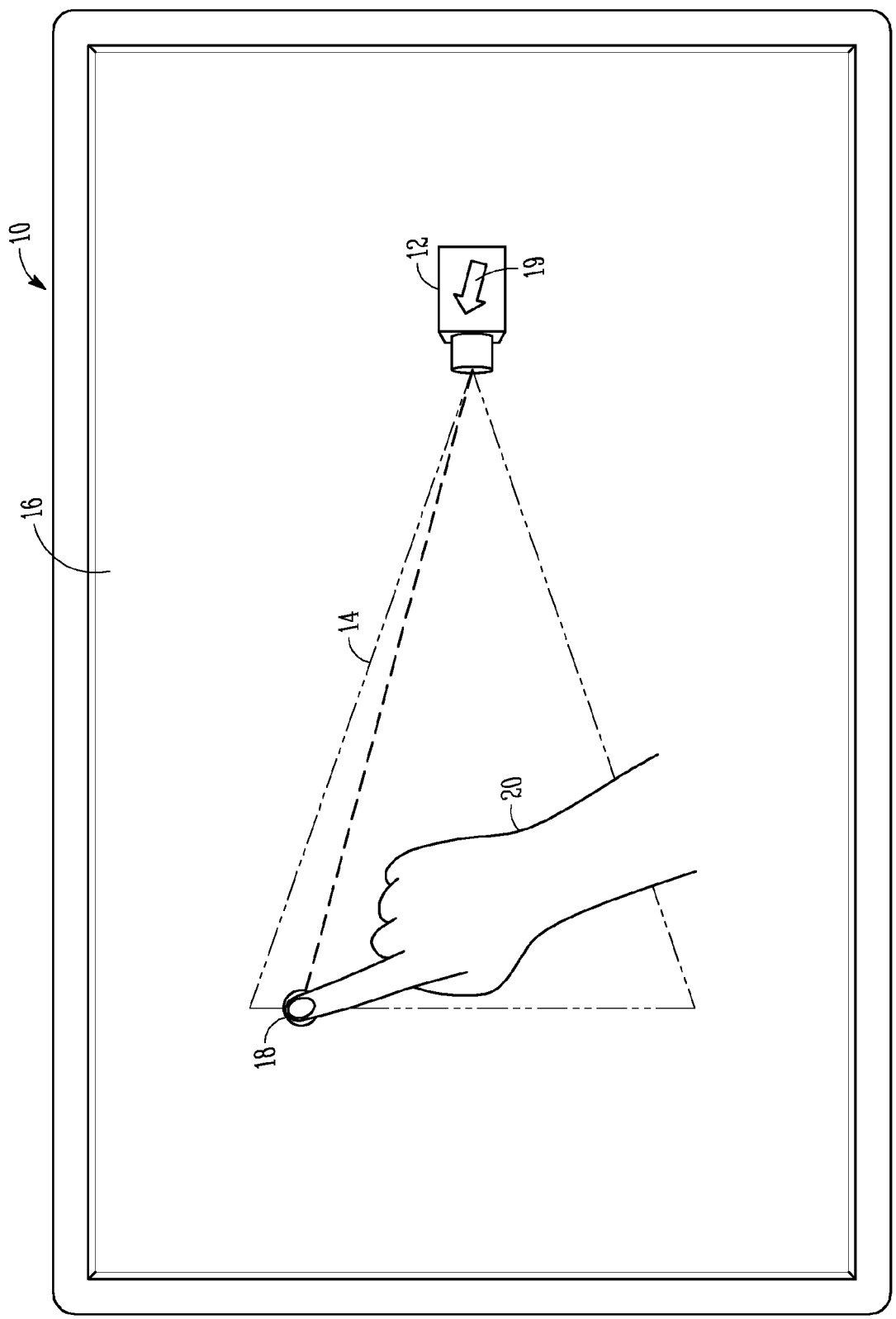

As shown in FIGS. 6A-6B, manipulating the camera 12 may include adjusting the tilt angle of the camera 12. FIG. 6A illustrates an example embodiment where a touch point anchor 18 appears within the field of view 14 before or after contact with the camera 12 or the field of view 14 of the camera 12 is detected.

In some embodiments, a level indicator 19 appears on the display 10. In the illustrated example embodiment, the level indicator 19 appears within the camera 12. FIG. 6B shows how a user 20 can adjust the tilt angle of the camera 12 by placing a finger on the touch point anchor 18 and moving the finger up or down.

Figure 7A:
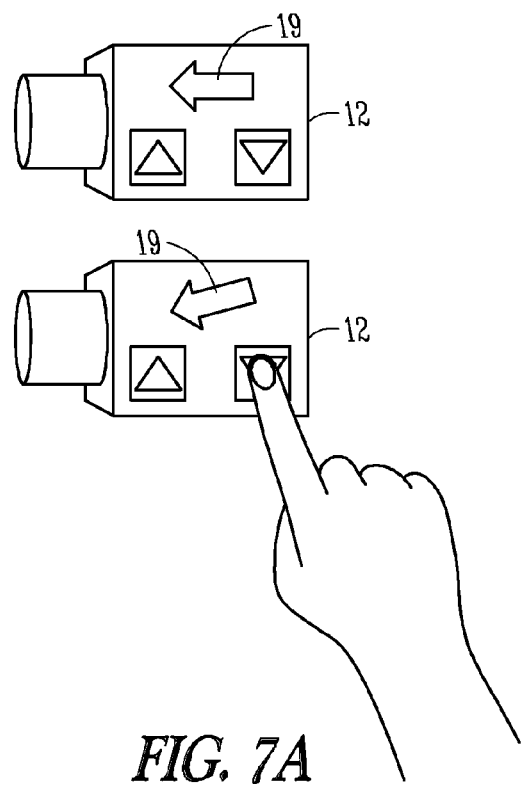
FIGS. 7A-7C illustrate another example method of adjusting the tilt angle of a camera based on contact with the camera on a touch-sensitive display.
Figure 7B:
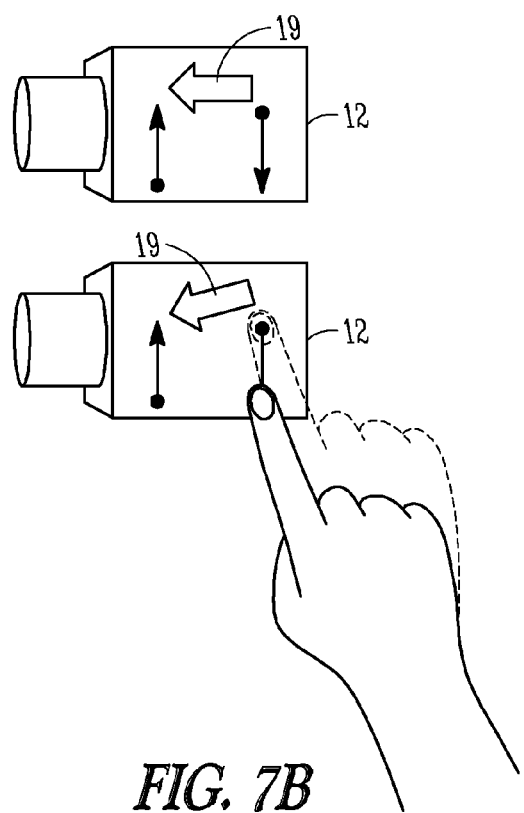
Figure 7C:
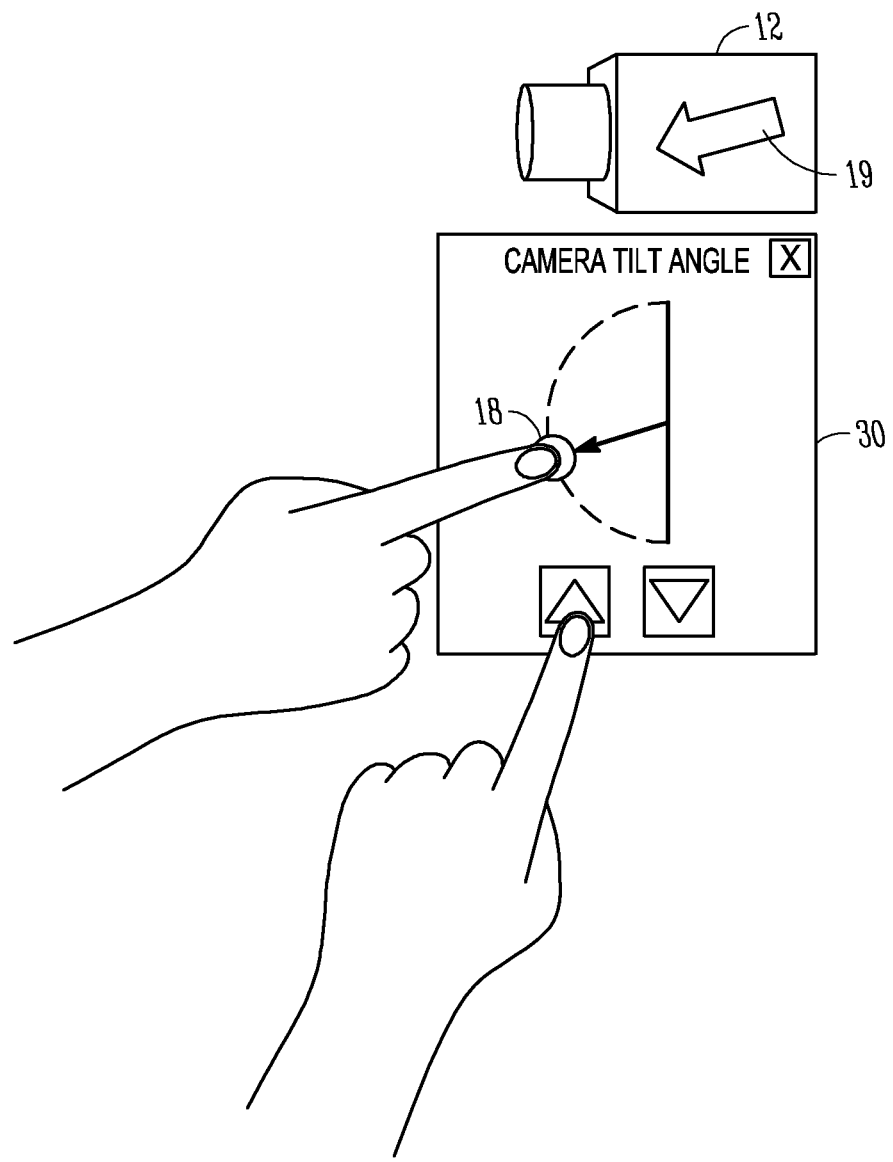

FIGS. 7A-7C illustrate example embodiments where the tilt angle is manipulated by contacting the camera 12 on the display 10. FIG. 7A shows an example embodiment of a camera 12 where a user 20 manipulates up and down buttons on the camera 12 to adjust the tilt angle of the camera 12. FIG. 7B shows an example embodiment of a camera 12 where a user 20 makes up and down swiping gestures on the camera 12 to adjust the tilt angle of the camera 12. FIG. 7C shows an example embodiment of a camera 12 where an overlay 30 appears once contact is made with the camera 12 by a user 20. The user 20 then makes whatever gestures are indicated by the overlay 30 on the display 10 in order to adjust the tilt angle of camera 12.

Figure 8A:
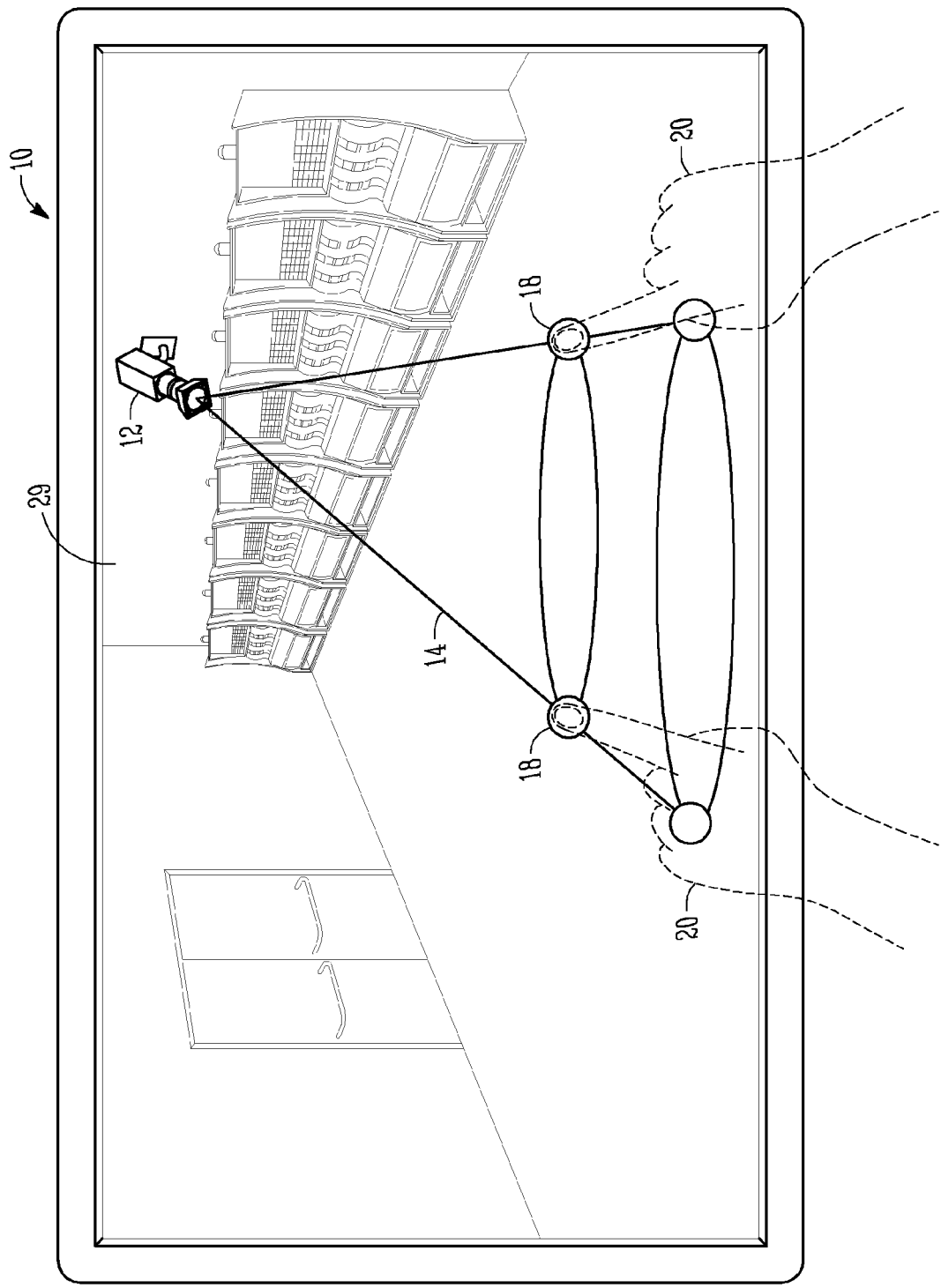
FIGS. 8A-8B illustrate an example method of manipulating the zoom of a camera based on contact with the field of view of the camera shown on a touch-sensitive display where the display is showing a three dimensional model of an environment where the camera is located.
Figure 8B:
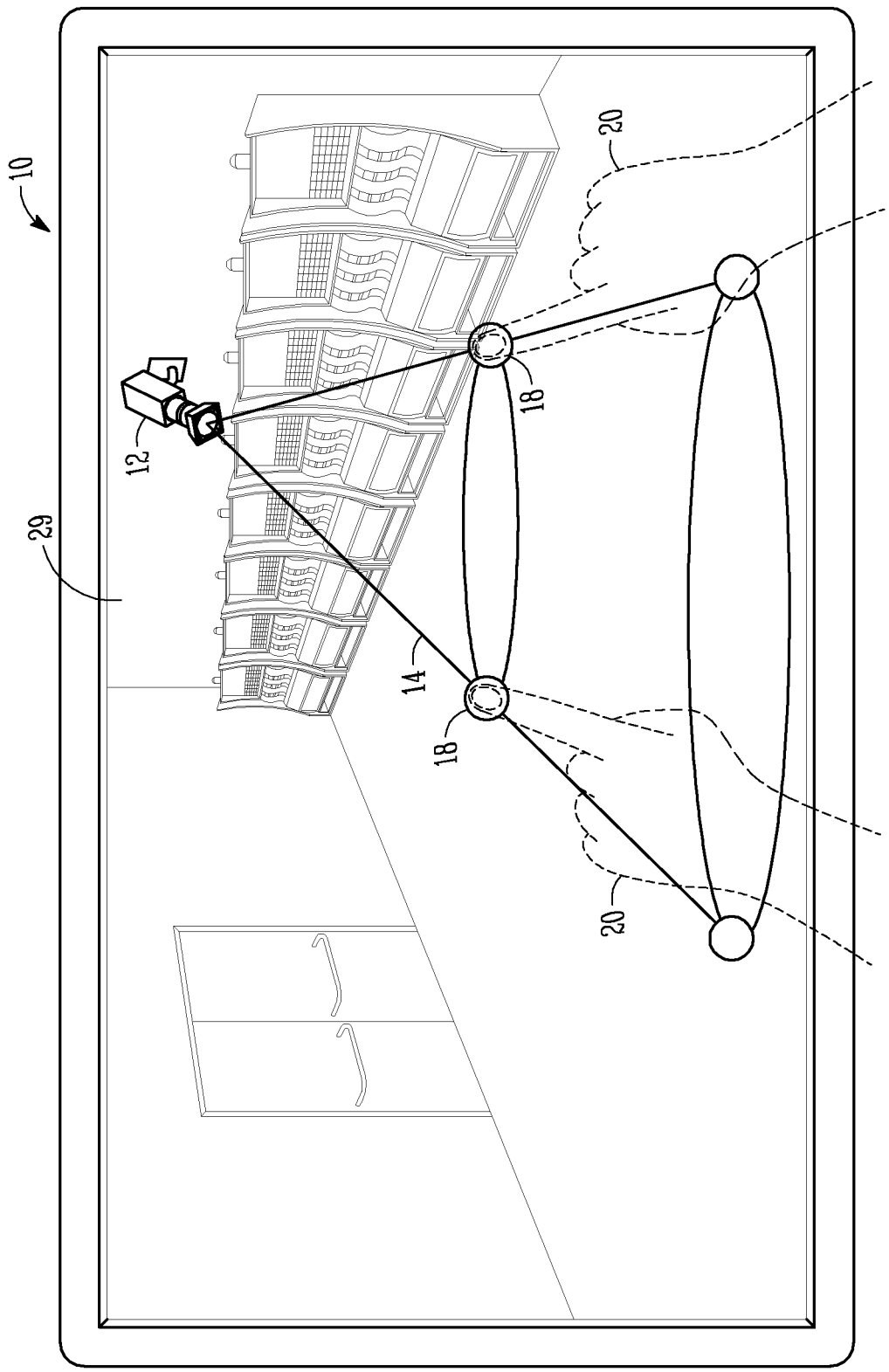

FIGS. 8A-8B illustrate an example method of manipulating the zoom of a camera 12 based on contact with the field of view 14 of the camera 12 shown on a touch-sensitive display 10. In the example embodiment illustrated in FIGS. 8A-8B, showing a camera 12 and a field of view 14 of the camera 12 on a touch-sensitive display 10 includes showing a three dimensional model 29 on the touch-sensitive display 10 of an environment where the camera 12 is located.

FIG. 8A illustrates an example embodiment where contact with the camera 12 or the field of view 14 of the camera 12 is detected and two touch point anchors 18 appear along the edges of the field of view 14 on the display 10. FIG. 8B illustrates manipulating the zoom of the camera 12 toward the camera by placing two fingers on the respective anchors 18 and moving the fingers toward the camera 12. The field of view 14 becomes wider as the fingers move toward the camera 12.

Although not shown in the FIGS., the zoom of the camera 12 could also be moved farther away from the camera 12 when fingers are moved away from the camera 12. The field of view 14 would then become narrower as the fingers move away from the camera 12.

Figure 9A:
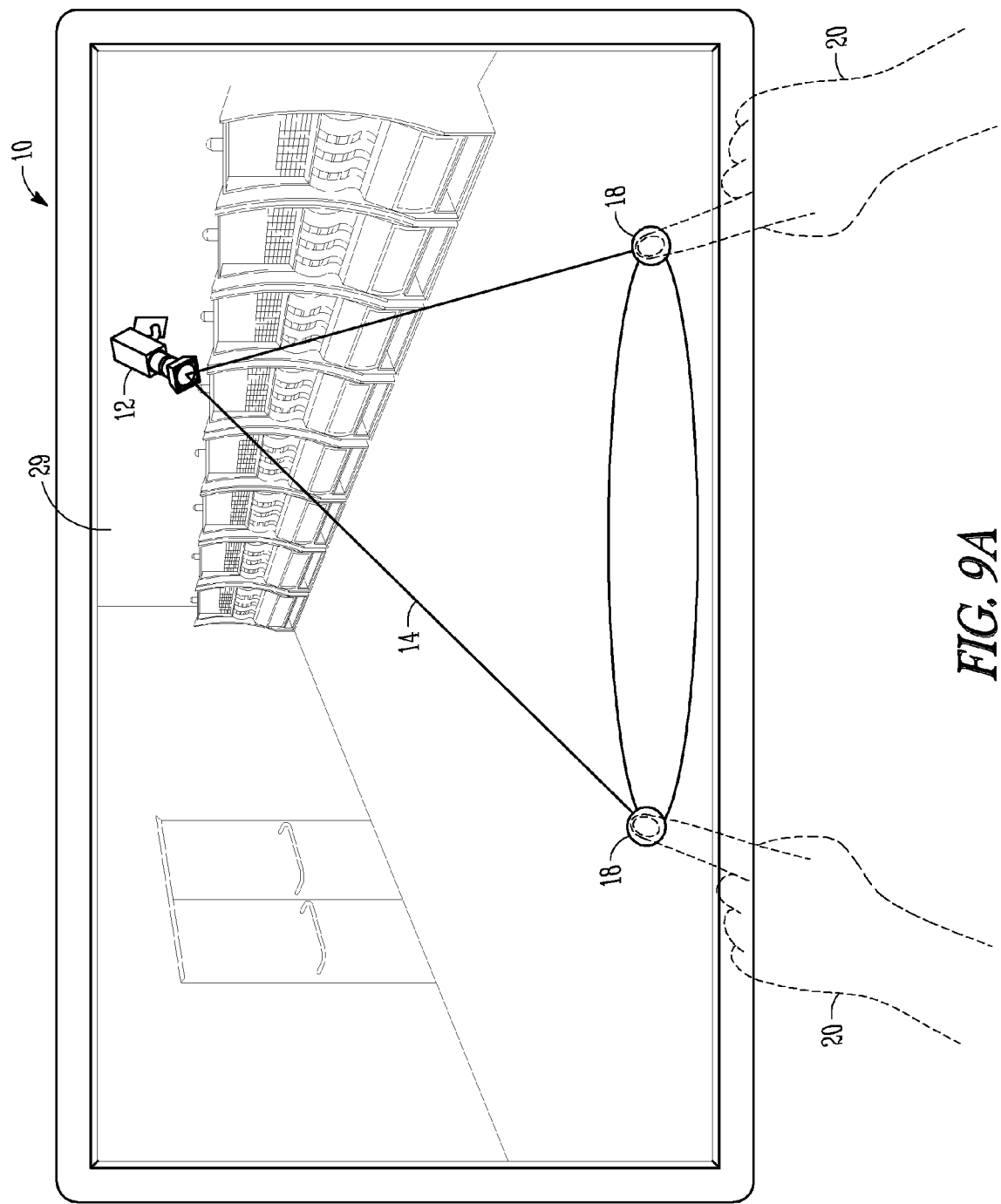
FIGS. 9A-9B illustrate an example method of manipulating the pan angle of a camera based on contact with the field of view of the camera shown on a touch-sensitive display where the display is showing a three dimensional model of an environment where the camera is located.
Figure 9B:
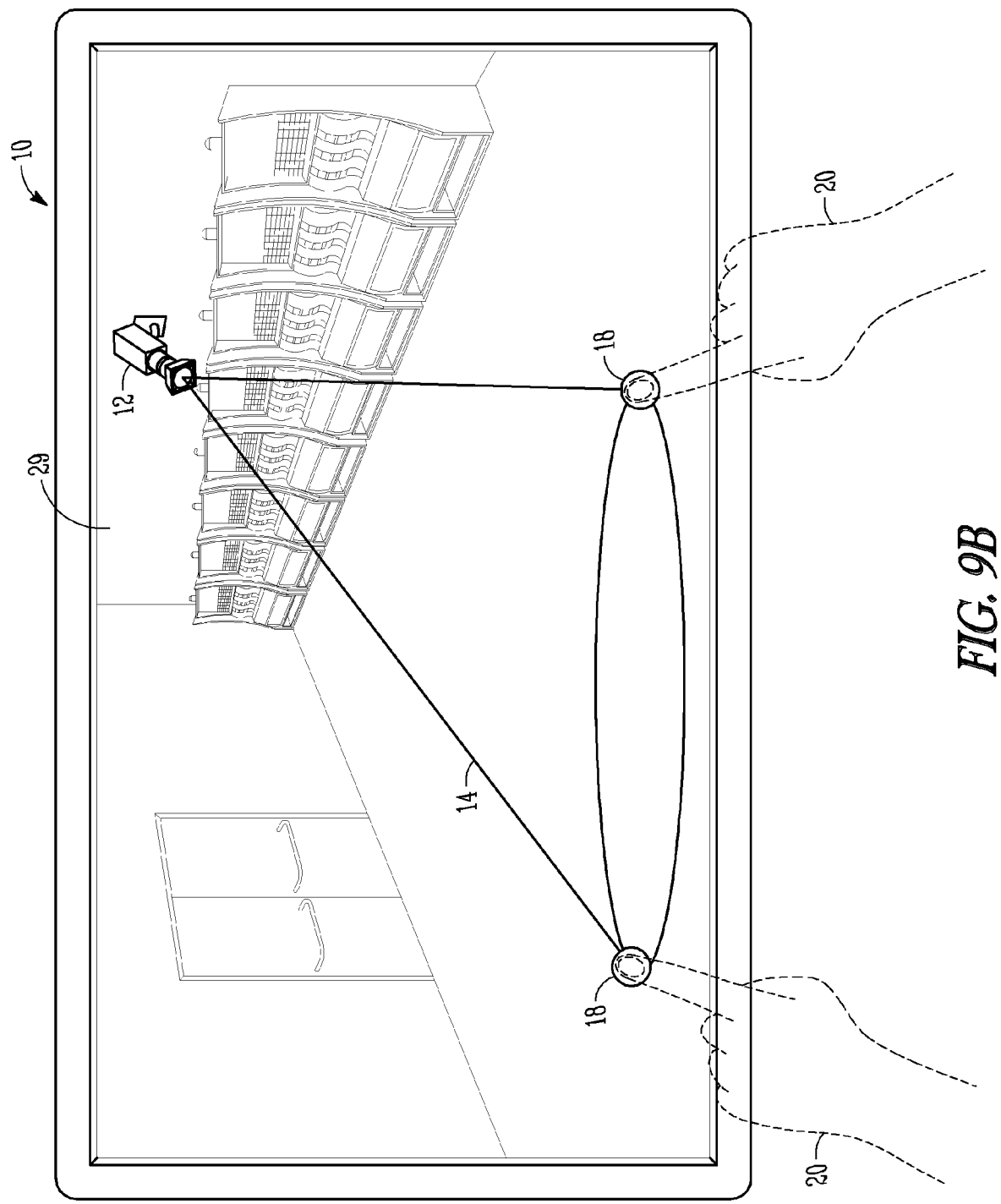

FIGS. 9A-9B illustrate an example method of manipulating the pan and/or tilt angle of a camera 12 based on a gesture conducted on the field of view 14 of the camera 12 shown on the touch-sensitive display 10. In the example embodiment illustrated in FIGS. 9A-9B, showing a camera 12 and a field of view 14 of the camera 12 on a touch-sensitive display 10 includes showing a three dimensional model 29 on the touch-sensitive display 10 of an environment where the camera 12 is located.

FIG. 9A illustrates where there is contact with the field of view 14 of the camera 12 at two touch point anchors 18 along the edges of the field of view 14 on the display 10. FIG. 9B illustrates manipulating the pan and/or tilt angle of the camera 12 by placing two fingers on the respective touch point anchors 18 and moving the fingers in either direction around the camera 12.

Figure 10:
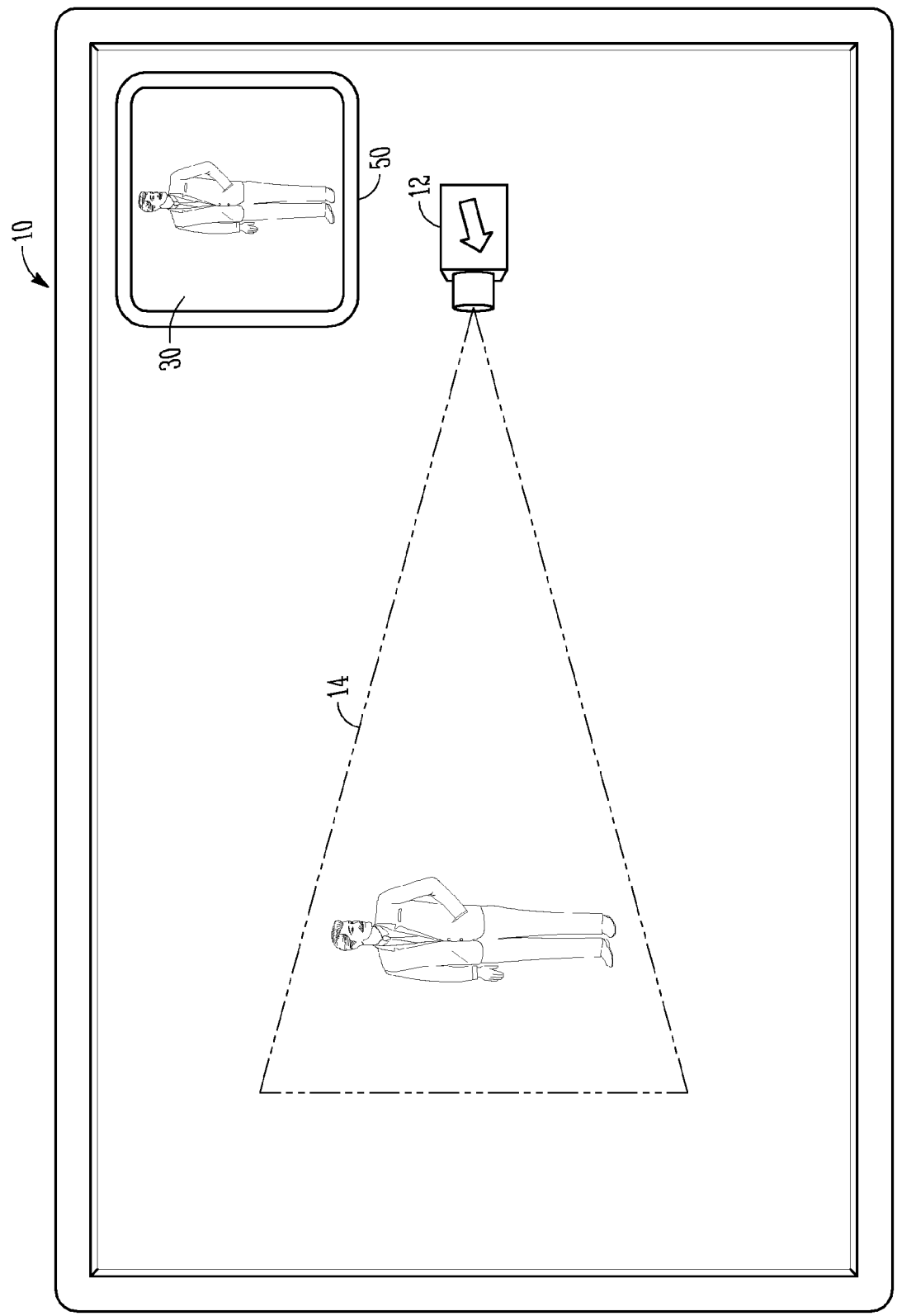
FIG. 10 illustrates an example method of manipulating assets on a touch-sensitive display that includes displaying video from a camera shown on the touch-sensitive display.

As shown in FIG. 10, the method may further include displaying video 30 (e.g., live or still video) on the touch-sensitive display 10 that is recorded by the camera. In the example embodiment that is illustrated in FIG. 10, displaying video 30 on the touch-sensitive display 10 that is recorded by the camera 12 includes displaying video 30 on an overlay 50 that is generated on the touch-sensitive display 10.

Figure 11:
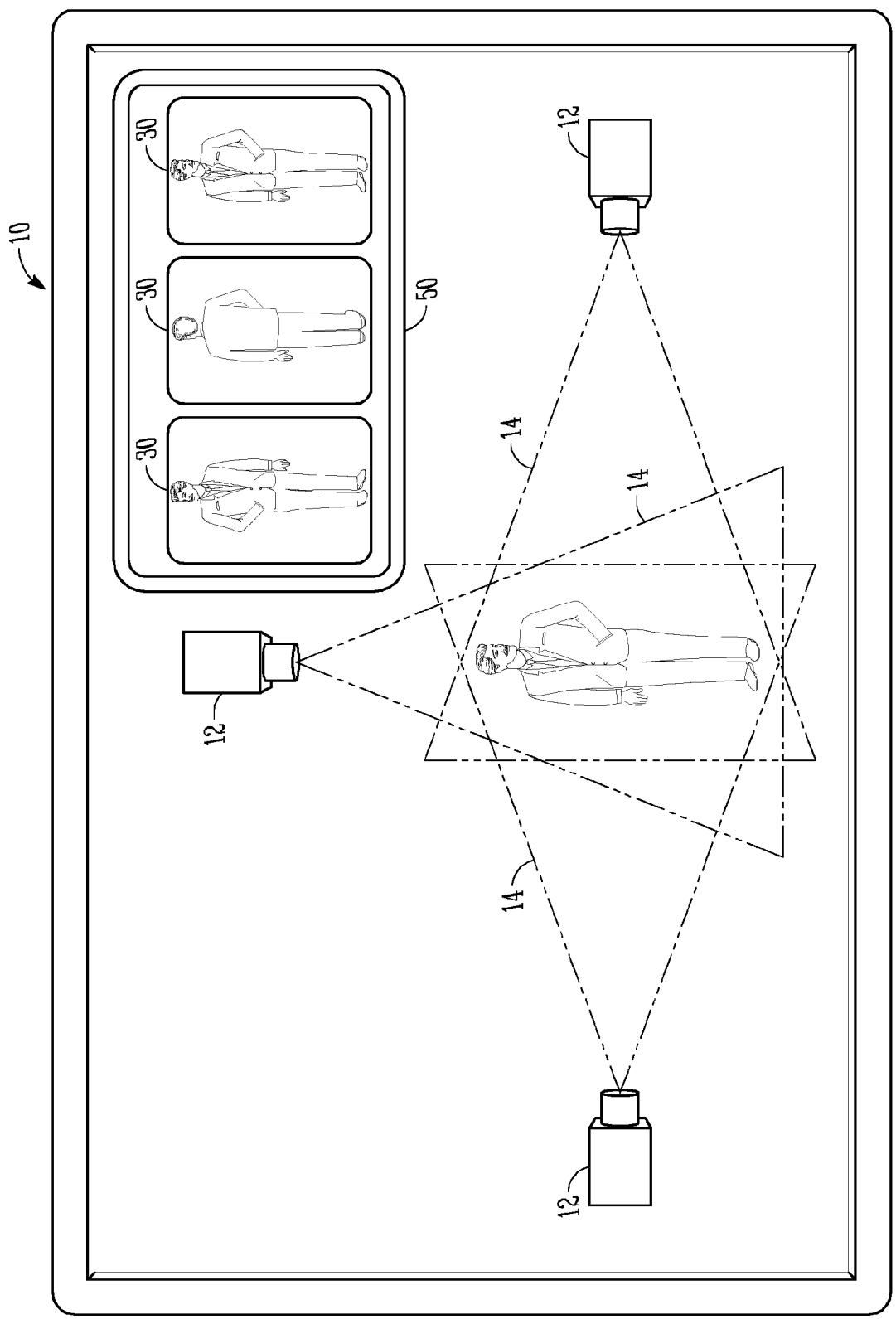
FIG. 11 illustrates an example method of manipulating assets on a touch-sensitive display that includes displaying videos from a plurality of cameras that are shown on the touch-sensitive display.

In some embodiments, a plurality of cameras 12 and a field of view 14 associated with each camera 12 may be shown on the touch-sensitive display 10 (see FIG. 11) such that displaying video 30 on the touch-sensitive display 10 includes displaying a video 30 for each camera 12 shown on the touch-sensitive display 10. In the example embodiment that is illustrated in FIG. 11, the plurality of videos 30 are displayed on an overlay 50 that is generated on the touch-sensitive display 10.

Figure 12:
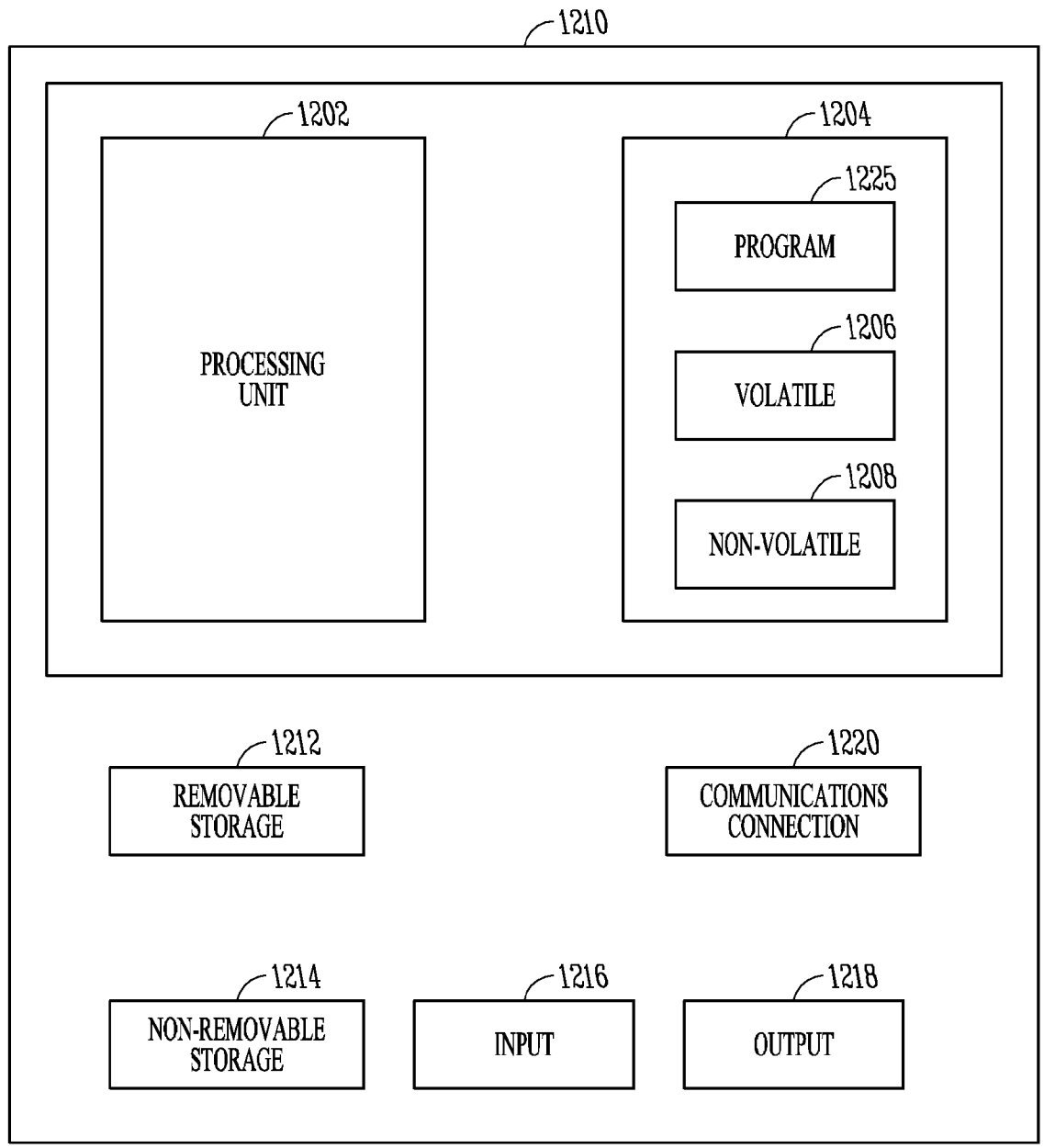
FIG. 12 is a block diagram of an example system for executing the method described herein with reference to FIGS. 1-11.

A block diagram of a computer system that executes programming 1225 for performing the above method is shown in FIG. 12. The programming may be written in one of many languages, such as virtual basic, Java and others. A general computing device in the form of a computer 1210, may include a processing unit 1202, memory 1204, removable storage 1212, and non-removable storage 1214. Memory 1204 may include volatile memory 1206 and non-volatile memory 1208. Computer 1210 may include—or have access to a computing environment that includes—a variety of computer-readable media, such as volatile memory 1206 and non-volatile memory 1208, removable storage 1212 and non-removable storage 1214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1210 may include or have access to a computing environment that includes input 1216, output 1218, and a communication connection 1220. The input 1216 may be a keyboard and mouse/touchpad, or other type of data input device, and the output 1218 may be a display device or printer or other type of device to communicate information to a user. In one embodiment, a touch screen device may be used as both an input and an output device.

The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1202 of the computer 1210. A hard drive, CD-ROM, and RAM are some examples of articles including a computer-readable medium.

The methods described herein may help security personnel to effectively support security monitoring and response tasks. Users can interact with a touch-sensitive display by using intuitive gestures that support performing tasks and activities such as monitoring un-related assets and/or responding to an incident. The information provided on the display gives the context that is needed for effective interaction by users with assets (e.g., cameras) within a complex environment. Users can effectively interact (i.e., view and/or adjust) with assets using a variety of single-touch and multi-touch gestures on the touch-sensitive display.

The display may show 3-D or 2-D views of an environment depending on what is the most effective representation of a situation (environment and context). The environment (e.g., a building) or assets (e.g., equipment) can be shown on the touch-sensitive display such that a user can easily access and manipulate the assets using gestures on the touch-sensitive display.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method of displaying items on a touch-sensitive display comprising:

showing a camera icon and a field of view of the camera relative to the camera icon on the touch-sensitive display;

detecting contact with the camera icon or the field of view of the camera on the touch-sensitive display; and adjusting a position of the camera by tracing a gesture on the camera icon shown on the touch-sensitive display to control the pan, tilt or zoom of the camera.

2. The method of claim 1, wherein showing a camera icon and a field of view of the camera on the touch-sensitive display includes showing a two dimensional map on the touch-sensitive display.

3. The method of claim 1, wherein showing a camera icon and a field of view of the camera on the touch-sensitive display includes showing a three dimensional model on the touch-sensitive display.

4. The method of claim 1, further comprising displaying video on the touch-sensitive display that is recorded by the camera.

5. The method of claim 4, wherein displaying video on the touch-sensitive display that is recorded by the camera includes displaying video on an overlay that is generated on the touch-sensitive display.

6. The method of claim 1, wherein showing a camera icon and a field of view of the camera on the touch-sensitive display includes showing a plurality of camera icons and a field of view associated with each camera icon on the touch-sensitive display, and wherein displaying video on a touch-sensitive display includes displaying a video for each camera icon shown on the touch-sensitive display.

7. A system comprising:

a touch-sensitive display;

a processor that shows a camera icon and a field of view of the camera relative to the camera icon on a touch-sensitive display; wherein the processor detects contact with the camera icon or the field of view of the camera on the touch-sensitive display, and wherein the processor adjusts a position of the camera by tracing a gesture on the camera icon shown on the touch-sensitive display to control the pan, tilt or zoom of the camera.

8. The system of claim 7 wherein the processor shows a two dimensional map on the touch-sensitive display.

9. The system of claim 7 wherein the processor shows a three dimensional model on the touch-sensitive display.

10. The system of claim 7 wherein the processor displays video on the display that is recorded by the camera.

11. The system of claim 10 wherein the processor displays video on an overlay that is generated on the display.

12. The system of claim 10 wherein the processor displays a video for each camera shown on the touch-sensitive display.

* * * * *